United States Patent [19]

Noda

[11] Patent Number: 4,473,839
[45] Date of Patent: Sep. 25, 1984

[54] SIGNAL PROCESSING CIRCUIT FOR VIDEO CAMERA

[75] Inventor: Masaru Noda, Fujisawa, Japan
[73] Assignee: Hitachi, Ltd., Tokyo, Japan
[21] Appl. No.: 440,420
[22] Filed: Nov. 9, 1982
[30] Foreign Application Priority Data
Nov. 13, 1981 [JP] Japan .................. 56-181111
[51] Int. Cl.³ .................................... H04N 9/04
[52] U.S. Cl. ........................... 358/41; 358/21 R
[58] Field of Search ............... 358/41, 29, 21 R, 44

[56] References Cited
U.S. PATENT DOCUMENTS
4,232,331 11/1980 Motoyama et al. ............... 358/44

Primary Examiner—Richard Murray
Attorney, Agent, or Firm—Antonelli, Terry & Wands

[57] ABSTRACT

A signal processing circuit for automatically adjusting the black level balance of each color signal of a video signal for a color video camera is disclosed. Clamp circuits clamp the blanking period of each color signal at a clamp level capable of being controlled from an external source. The level of the portion of the color difference signal waveform corresponding to the optical black mask is compared with the level of the portion thereof subjected to the blanking process by comparators and the clamp levels of the clamp circuits are controlled according to the resulting difference voltage. The level comparator circuits sample-and-hold the waveform of the color difference signal by two sample-and-hold circuits turned on by a gate pulse generated corresponding to the optical black and by a gate pulse generated corresponding to the blanking period respectively. The result of the level comparison is fed back to the clamp circuits so that the clamp level is controlled to automatically eliminate the level difference, thus adjusting the black balance to an optimum level.

10 Claims, 7 Drawing Figures

SIGNAL PROCESSING CIRCUIT FOR VIDEO CAMERA

BACKGROUND OF THE INVENTION

The present invention relates to a signal processing circuit for a video camera, or more in particular to a clamp circuit for adjusting the balance of the black level of the video signal of the color video camera.

In a color video camera, waveform-shaping processes for the video signal are generally required including the addition of a pedestal component, the gamma correction and the white level clipping. For performing these processes, it is necessary to determine a reference value, and therefore a circuit for performing these processes is required to include a clamp circuit.

Conventionally, the clamping process in such a processing circuit is accomplished in the manner mentioned below. First, a light mask called the optical black mask is provided at least on a lateral or vertical end of an image-pickup tube, thereby producing a signal with a black level corresponding to the optical black mask at the end of horizontal or vertical scanning. The clamp circuit sample-holds the black level and comparing a reference voltage with the level thus held, clamps the optical black level to the reference voltage by such a method as the feedback of the comparison output. This clamp circuit is provided separately for the processing circuit of each of the R, G and B channels of the three primary colors, so that the optical black level of each signal is clamped to the reference voltage.

In the video camera, the black balance indicates the fact that the black levels of the R, G and B channels are arranged in a manner to reduce the color difference signals (R−Y) and (B−Y) of the color encoder input to zero so that the extraneous coloring of the black portion of an object may be avoided or the extraneous coloring of the corresponding portion of the reproduced image may be eliminated when an image of a colorless object is picked up at a place extremely low in illumination. The accuracy of arranging the black levels is required to be as high as about 1% of the reference signal level, and in order to meet this requirement, variable resistors for adjusting the clamp levels of R, G and B channels respectively must be carefully operated. In addition to this problem, it is also necessary to pay adequate consideration and cost to the circuit design and the quality of the parts in order to prevent fluctuations which otherwise might be caused by temperature changes or vibrations of a camera after adjustment. Another disadvantage is that since the Y signal is generally produced by the combination of R, G and B signals, the black levels of R and B signals are correlated with that of the Y signal and therefore the black level of the Y signal is affected by the black level adjustment of the R or B signal, with the result that the adjustment of black level is required to be repeated for the three channels to attain convergence.

SUMMARY OF THE INVENTION

Accordingly, it is an object of the present invention to provide a black level clamp circuit suitable for signal processing for a color video camera, in which a highly accurate and stable black balance is automatically attained only by simple rough adjustment without any manual adjustment.

In order to achieve the above-mentioned object, according to the present invention, there is provided a signal processing circuit, in which the voltage difference caused between the level corresponding to the optical black and the level of the blanking section in a color difference signal waveform when the black balance is lost is detected, the resulting detection output is fed back to a clamp circuit thereby to control the clamp level, thus reducing the voltage difference to zero again. The detection of the voltage difference is effected by sample-holding the levels and comparing them with each other. The black levels of two of the processing circuits of the three primary color signals are controlled by the detection output of the voltage difference between the optical black level and the blanking section level for the two color difference signals respectively, so that the black balance is automatically secured simply by adjusting the black level for the channel of the remaining one color signal as required.

DESCRIPTION OF THE PREFERRED EMBODIMENTS

Figure 1:
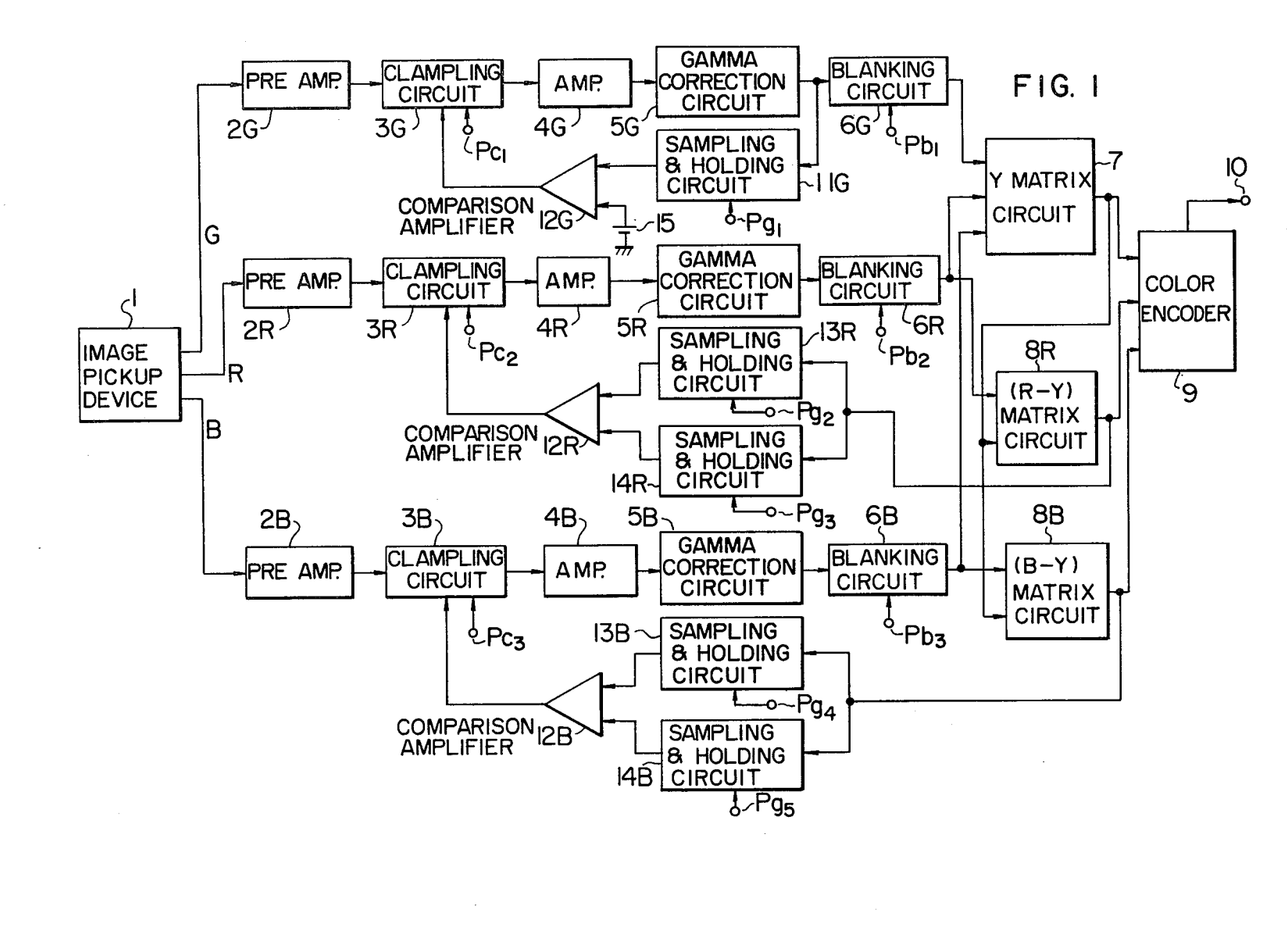
FIG. 1 is a diagram showing a circuit configuration of an embodiment of the present invention.

FIG. 1 is a block diagram showing an embodiment of the present invention applied to a color signal processing circuit of a color video camera. Reference numeral 1 designates an image pick-up device using an image pick-up tube or a semiconductor image pick-up element for producing the three primary color signals, namely, the green (G) signal, the red (R) signal and the blue (B) signal. Numerals 2G, 2R and 2B designate pre-amplifiers in which the characters G, R and B affixed to the numerals designate the circuits for the G signal channel, R signal channel and B signal channel respectively. This also applies to the other circuits. The color signals produced from the image pick-up device 1 are amplified by the pre-amplifiers 2G, 2R and 2B and then applied to clamp circuits 3G, 3R and 3B respectively. The color signals with the black levels thereof fixed by the clamp circuits 3G, 3R and 3B are amplified again by amplifiers 4G, 4R and 4B respectively and applied to gamma correction circuits 5G, 5R and 5B. The color signals that have been subjected to gamma correction at the gamma correction circuits 5G, 5R and 5B are applied to blanking circuits 6G, 6R and 6B respectively, where the blanking periods thereof are fixed at a predetermined level by blanking processing. The G, R and B signals thus waveform-shaped are used to generate a luminance (Y) signal at a Y matrix circuit 7. This Y signal and the R signal processed at the R channel are combined to produce a (R−Y) color difference signal at a color difference matrix circuit 8R. In similar fashion, the Y signal and the B signal processed at the B signal channel are used to produce a (B−Y) color difference signal at a color difference matrix circuit 8B. The Y signal, (R−Y) signal and (B−Y) signal are applied to a color encoder 9, so that a standard color video signal of NTSC system, for example, is produced at an output terminal 10.

The functional feature of the present invention lies in the clamp level control at the clamp circuits 3G, 3R and 3B, the operation of which will be explained below.

First, the operation for black level clamp at the G signal channel may be performed by the same configuration as the prior art mentioned above. The black level voltage of the waveform portion corresponding to the optical black portion is extracted and held by a sample-and-hold circuit 11G from an output signal of the gamma correction circuit 5G, and the resulting voltage and the voltage of a reference voltage source 15 are applied to a comparison amplifier 12G. The difference between these two signals is amplified at the comparison amplifier 12G, and the output thereof is fed back to the clamp circuit 3G thereby to control the clamp level. As a result, the black level voltage of the output signal of the gamma correction circuit 5G is made to coincide with the reference voltage applied to the comparison amplifier 12G.

In the operation of the black level clamp of the R signal channel, on the other hand, an output signal of the (R−Y) color difference matrix circuit 8R is applied to sample-and-hold circuits 13R and 14R, so that the black level voltage of the waveform portion corresponding to the optical black portion and the voltage of the waveform portion subjected to the blanking process are sampled out and held. The two voltages thus held are compared with each other and the difference therebetween is amplified at the comparison amplifier 12R, the amplified output of which is fed back to the clamp circuit 3R thereby to control the clamp level. As a result of this control, the black level of the (R−Y) color difference signal is rendered to coincide with the voltage of the blanking portion. The color encoder 9 in the next stage is for modulation with reference to the level of the blanking portion of the color difference signals. By making the black level coincide with the voltage of the blanking portion as mentioned above, therefore, the coloring at the black level is eliminated to strike a black balance. The operation of the B signal channel is exactly the same as that of the R signal channel. According to the principle of production of the Y signal, this signal contains the R and B signal components of about 30% and 11% respectively. When the black level of the R signal or B signal is controlled, therefore, the black level of the Y signal is also affected, thus reducing the correction effect of the black level of the color difference signal. By setting the gain of the feedback loop sufficiently high, however, the black levels of the R and B signal channels are stabilized following the reference of the black level of the G signal channel, with the result that the black level of the color difference signals finally coincide with the blanking levels thereof.

A specific example of the circuits making up the essential parts of the circuit shown in FIG. 1 will be explained below.

Figure 2:
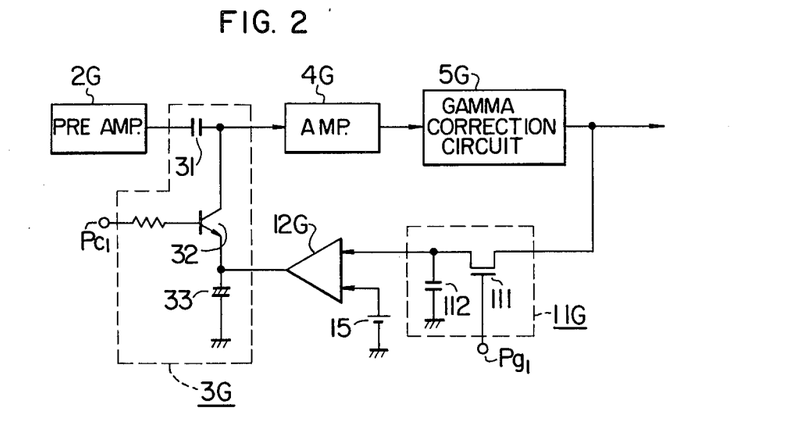
FIGS. 2 to 4 are circuit diagrams showing a specific example of the circuits making up the essential parts of the present invention.
Figure 5:
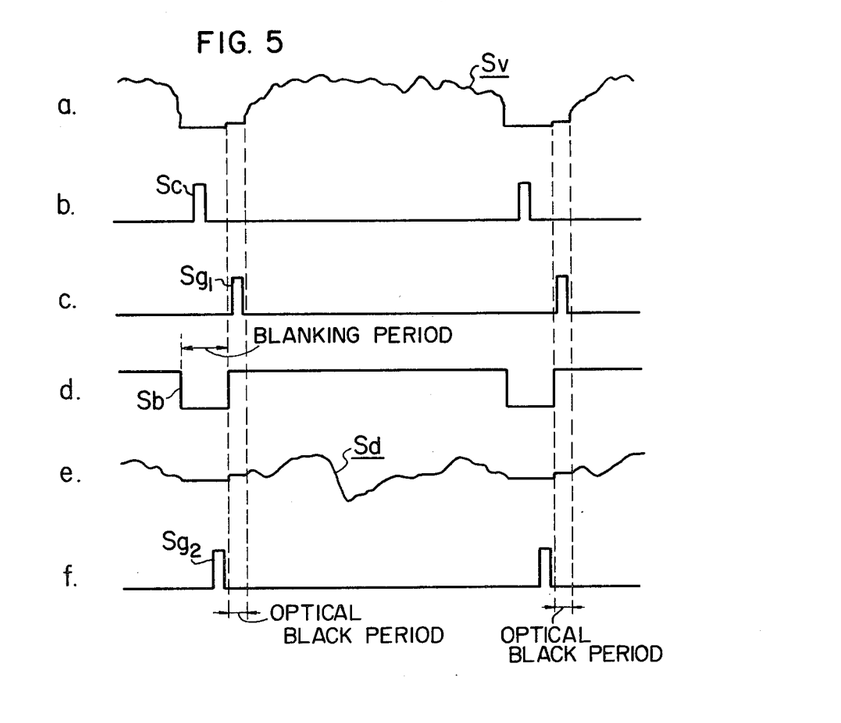
FIGS. 5a to 5f show signal waveforms produced from the essential parts for explaining the operation of an embodiment of the present invention.

FIG. 2 shows specific examples of the clamp circuit 3G and the sample-and-hold circuit 11G. The clamp circuit 3G, as shown in FIG. 2, is adapted to operate in response to a clamp pulse applied to the base of a switching transistor 32 through a terminal $P_{C1}$. When the transistor 32 is turned on by the clamp pulse $S_C$ shown in FIG. 5b, the prevailing level of the color signal $S_V$ applied to the amplifier 4G is fixed to the output voltage of the comparison amplifier 12G. The pulse $S_C$, as shown in FIGS. 5a and 5b, is adapted to coincide with the flyback period of the color signal $S_V$, namely, the blanking period, so that the input voltage to the amplifier 4G during the blanking period is clamped. The clamp pulse $S_C$ synchronous with the blanking period is easily produced by use of a signal produced from a sync signal generator means which is always provided, though not shown, for controlling the operation of the image pick-up element of the image pick-up device 1 or for adding a sync signal to a detected video signal in a video camera.

The sample-and-hold circuit 11G used for controlling the clamped level, as shown in FIG. 2, is comprised of a switching MOS FET 111 and a holding capacitor 112. Upon application of a gate pulse of the terminal $P_{g1}$ of the sample-and-hold circuit 11G, the MOS FET is turned on, and the input signal voltage involved is charged to a capacitor 112, and this voltage is held until the application of the next gate pulse. Therefore, if the gate pulse $S_{g1}$ applied to the terminal $P_{g1}$ is produced, as shown in FIG. 5C, during the period (optical black period) for reading the optical black mask portion provided in the image pick-up element, the potential of the black level corresponding to the optical black portion of the output signal of the gamma correction circuit 5G is extracted and held. The voltage thus held is compared with the voltage of a reference voltage source 15 at the comparison amplifier 12G. The gate pulse $S_{g1}$ is easily produced during the period corresponding to the optical black portion by the above-described sync signal generator means not shown. Specifically in view of the fact that the optical black mask is provided in producing the video camera beforehand, the timing of the waveform of the optical black portion appearing in each color signal produced from the image pick-up device is also known in advance. For instance, it appears at the starting portion of each horizontal scanning period. A gate pulse corresponding to the particular portion is thus easily produced simply by delaying a horizontal sync signal to some degree. Instead of the MOS FET, a bipolar transistor may be used as a switching element.

Figure 3:
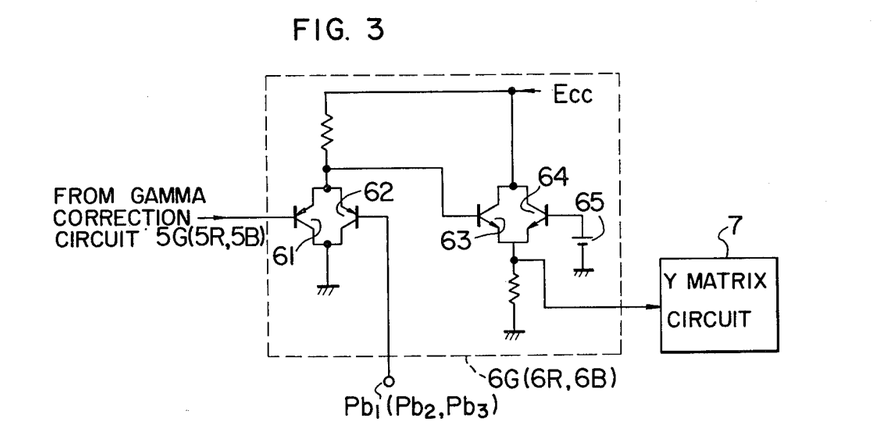

FIG. 3 is a diagram showing an example of the blanking circuits 6G, 6R and 6B. These circuits are for maintaining a waveform of an exactly predetermined potential during the blanking period in view of the fact that even after the blanking period of the video signal is clamped by the clamp circuit, minor changes remain or noises are mixed. The circuits 6G, 6R and 6B are realized by this construction. The blanking signal $S_b$ shown in FIG. 5d is such that it becomes "high" sufficiently during the video period and "low" during the blanking period. This signal $S_b$ is easily obtained by a sync signal generator, though not shown, in a manner similar to the clamp pulse or gate pulse described above. During the period when the blanking signal $S_b$ is at high level, the base of the transistor 62 is cut off so that the blanking signal $S_b$ acts on the color signal in the least. The color signal applied to the base of the transistor 61 is thus applied through the transistor 61 of emitter-follower construction and further through a transistor 63, is produced at the emitter thereof. When the blanking signal $S_b$ of the terminal $P_{b1}$ is reduced to low level, on the other hand, the transistor 62 is turned on and the emitter potential of the transistor 61 is reduced to a level lower than the black level of the video signal waveform. Under this condition, although the base potential of the transistor 63 is reduced, the emitter potential thereof, which is clamped by the emitter of the transistor 64, is fixed at the potential of the reference voltage source 65

(strictly, less the base-emitter voltage Vbe of the transistor 64). As a result, each color signal is superseded by a predetermined reference potential, thus producing a waveform of predetermined potential, namely, subjected to the blanking process.

Figure 4:
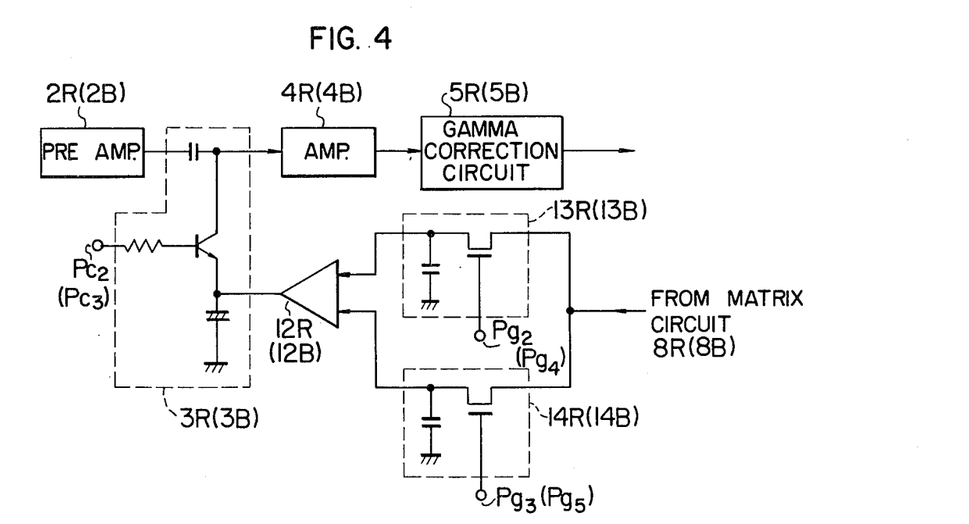

FIG. 4 shows an example of a specific circuit for controlling the clamp level by the difference between the black level of the optical black portion of the color difference signal waveform and the level of the waveform portion subjected to the blanking process. The clamp circuit 3R or 3B has exactly the same construction as the clamp circuit 3G described above with reference to FIG. 2. The sample-and-hold circuits 13R, 14R or 13B, 14B, like the circuits described above with reference to FIG. 2, include a holding capacitor and a switching MOS FET. The sample-and-hold circuits 13R, 14R or 13B, 14B are supplied with a color difference signal as shown in FIG. 5e produced from the color difference matrix circuit 8R or 8B, as the case may be, as shown in FIG. 1. For the purpose of sampling, the sample-and-hold circuit 13R or 13B is supplied with a gate pulse $S_{g1}$ of FIG. 5C at the terminal $P_{g2}$ or $P_{g4}$, as the case may be, in order to detect the black level of the optical black portion, while the other sample-and-hold circuit 14R or 14B is supplied with a gate pulse $S_{g2}$ of FIG. 5f at the terminal $P_{g3}$ or $P_{g5}$, as the case may be, in order to detect the level of the waveform subjected to the blanking process. The outputs of the two sample-and-hold circuits 13R and 14R or 13B and 14B are compared with each other, and the clamp level is controlled in accordance with the potential difference therebetween thereby to eliminate the same potential difference. The gate pulse $S_{g2}$, which is produced at a predetermined timing during the blanking period as shown in FIG. 5f, is easily obtained on the basis of the signal produced from sync signal generator means in the same manner as mentioned above.

Figure 6:
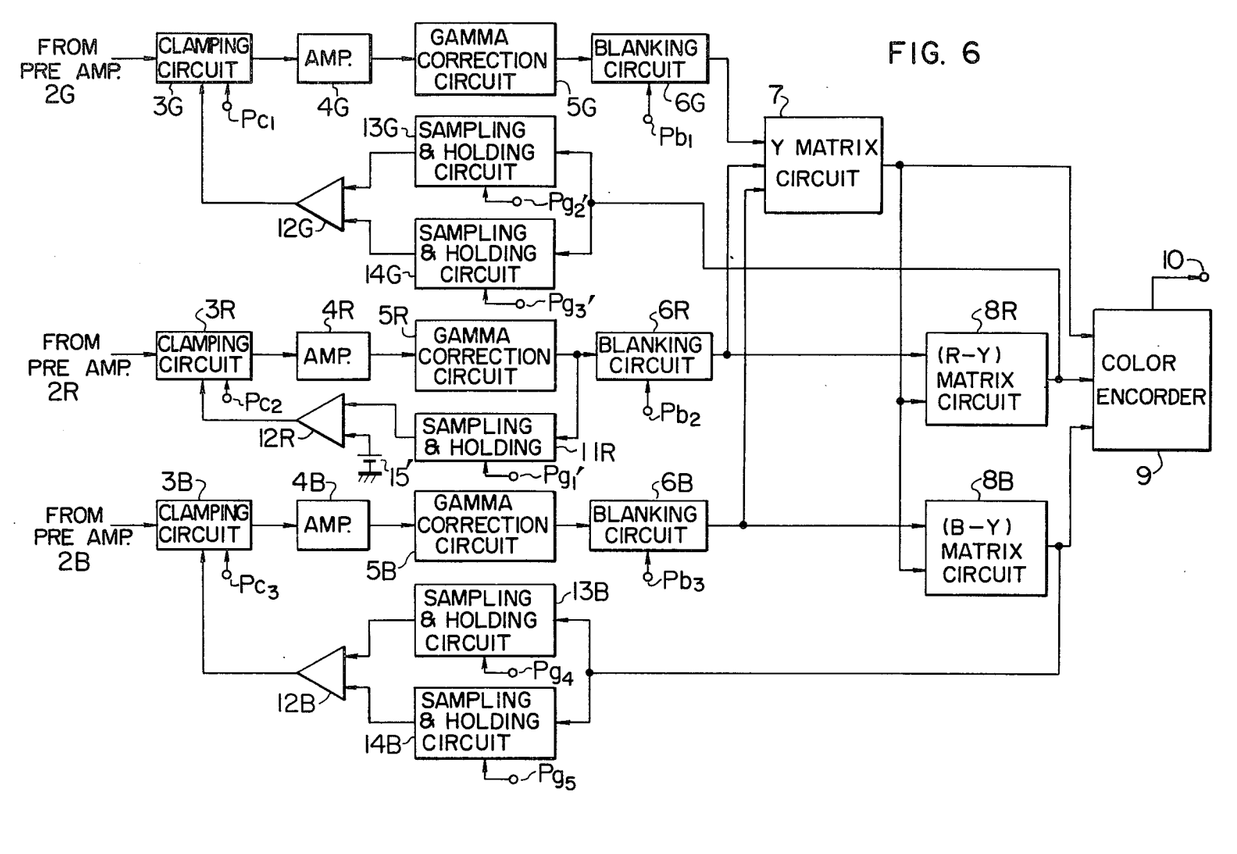
FIGS. 6 to 7 are diagrams showing modifications of the embodiments of the present invention.

Modifications of the present invention will be described. In a first modification, as shown in FIG. 6, the black level of the R signal is clamped, like the black level of the G signal channel in the embodiment shown in FIG. 1, by the signal of its own channel. Specifically, in response to the output signal of the gamma correction circuit 5R, the black level voltage of the optical black is sampled and held at the sample-and-hold circuit 11R by the gate pulse $S_{g1}$ applied to the terminal $P_{g1'}$. This voltage is compared with the reference voltage of the reference voltage source 15' and amplified at the comparison amplifier 12R, and fed back to the clamp circuit 3R thereby to control the clamp level. The output of the (R−Y) matrix circuit 8R is applied to the two sample-and-hold circuits 13G and 14G in such a manner that the gate input terminal $P_{g2'}$, of the sample-and-hold circuit 13G is impressed with the gate pulse $S_{g1}$ shown in FIG. 5C, while the gate input terminal $P_{g3'}$ of the other sample-and-hold circuit 14G is supplied with the gate pulse $S_{g2}$ of FIG. 5f. The voltage obtained by comparing the black level voltage of the optical black level of the (R−Y) color difference signal with the voltage of the blanking portion and amplifying the resulting voltage is fed back to the clamp circuit 3G of the G signal channel. As a result, the black levels of the G signal channel and the B signal channel are determined to coincide with the black level of the R signal channel, so that the black level of the color difference signal coincides with the voltage of the blanking portion thereof.

In a second modification, the black level voltage of the optical black is sampled and held in response to the output signal of the gamma correction circuit 5B of the B signal channel though not shown, and the resulting voltage is compared with a reference voltage, amplified and fed back to the clamp circuit 3B. Further, the voltage obtained by comparing the black level voltage of the optical black of the (B−Y) color difference signal with the voltage of the blanking portion and amplifying the resulting voltage is fed back to the clamp circuit 3G of the G signal channel. In this case, with reference to the black level of the B signal channel, the black levels of the other two channels are automatically corrected to attain a stable black balance.

Figure 7:
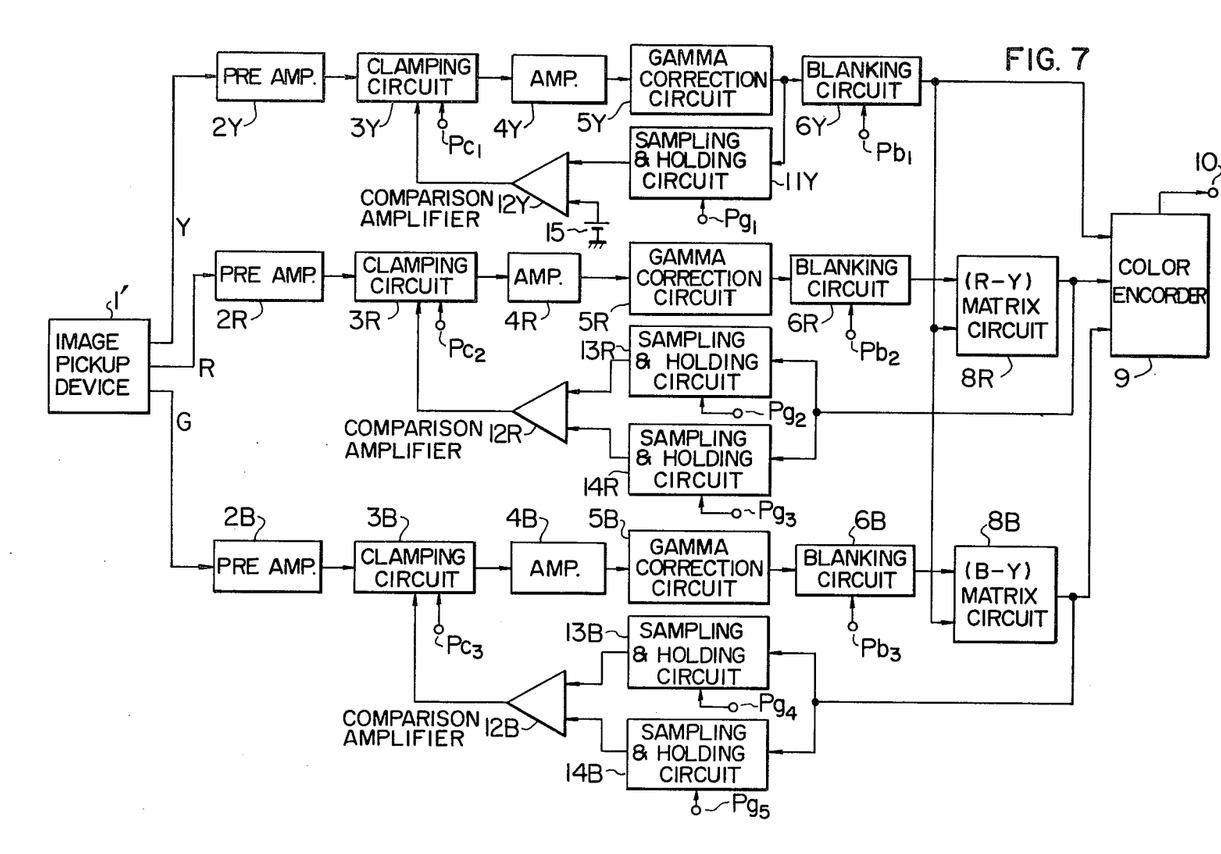

The foregoing description of the embodiments concerns the case in which the three primary color signals of R, G and B are produced from the image pick-up device 1. In the case of an image pick-up device producing a luminance Y signal in place of the G signal, however, the channel for processing the G signal shown in FIG. 1 may be used as a circuit for processing the Y signal. In this case, since the Y signal is produced from the image pick-up device 1', the Y matrix circuit 7 shown in FIG. 7 may be eliminated as shown in FIG. 7.

I claim:

1. A signal processing circuit for a color video camera for automatically adjusting the balance of the black level of a video signal obtained by an image pick-up element, comprising:
   an optical black mask for optically masking a predetermined part of the light-receiving surface of an image pick-up element;
   blanking processing means for fixing that part of a plurality of signals corresponding to the blanking period including at least two color signals produced from the image pick-up element, to a predetermined potential;
   means for producing a color difference signal from the signal subjected to the blanking process;
   means for detecting the voltage of the waveform of the color difference signal corresponding to the portion thereof optically masked by said optical black mask and the voltage of the waveform portion thereof subjected to the blanking process;
   comparator means for producing an error voltage corresponding to the difference between the voltages detected by said detector means; and
   means for clamping the waveform portion corresponding to the blanking period of the signal produced from said image pick-up element and not yet subjected to the blanking process and controlling the clamp level thereof by the error voltage produced from said comparator means.

2. A signal processing circuit according to claim 1, wherein said means for detecting the voltage of said color difference signal waveform includes first sample-and-hold circuits turned on by a gate pulse generated at a timing of production by said image pick-up device of a signal representing the portion of said light-receiving surface optically masked by said optical black mask, said first sample-and-hold circuits being supplied with the color difference signal at the input thereof, and second sample-and-hold circuits turned on by a gate pulse generated during the blanking period and supplied with said color difference signal at the input thereof, and said comparator means includes comparison amplifiers supplied with the outputs of said first and second sample-and-hold circuits at the two inputs thereof.

3. A signal processing circuit for automatically adjusting the black balance of an output video signal for a color video camera including an image pick-up device for producing the three primary color signals separately, comprising:

an optical black mask for optically masking a predetermined part of the light-receiving surface of the image pick-up device;

first, second and third clamp means for clamping the waveforms corresponding to the blanking period of said three primary color signals respectively, the clamp levels being capable of being controlled by a signal applied from an external source;

means for detecting the voltage of the waveform corresponding to the portion optically masked by said optical black mask, of the waveform of the green color signal passed through said first clamp means, comparing said voltage with a reference voltage, and applying a signal corresponding to the difference therebetween to said first clamp means, thereby controlling the clamp level of the green color signal;

three blanking processing means for fixing the waveforms of the portions corresponding to the blanking period of said three color signals to a predetermined voltage respectively;

means for producing a red color difference (R−Y) signal and a blue color difference (B−Y) signal from the color signals subjected to the blanking process;

means for detecting the level of the waveform corresponding to the portion of said red color difference (R−Y) signal optically masked by said optical black mask and the level of the waveform of the portion thereof subjected to the blanking process, generating a signal corresponding to the difference between said levels, and applying said signal to said second clamp means for clamping the red color signal, thereby controlling the clamp level of said red color signal; and means for detecting the level of the portion of said blue color difference (B−Y) signal waveform corresponding to the portion thereof optically masked by said optical black mask and the level of the waveform portion thereof subjected to the blanking process, producing a signal corresponding to the difference between said levels, and applying said signal to said third clamp means for clamping the blue color signal, thereby controlling the clamp level of said blue color signal.

4. A signal processing circuit according to claim 3, wherein said means for controlling the clamp level of said second and third clamp means include first sample-and-hold circuits turned on by a gate pulse generated at a timing of production by said image pick-up device of a signal corresponding to the portion of the light-receiving surface optically masked by said optical black mask, said first sample-and-hold circuits being supplied with a color difference signal at the input thereof, second sample-and-hold circuits turned on by a gate pulse generated during the blanking period and supplied with said color difference signal at the input thereof, and comparison amplifiers supplied with the outputs of said first and second sample-and-hold circuits at the two inputs thereof respectively.

5. A signal processing circuit for automatically adjusting the black balance of an output video signal for a color video camera including an image pick-up device for producing the three primary color signals of green, red and blue, comprising:

an optical black mask for optically masking a predetermined part of the light-receiving surface of said image pick-up device;

first, second and third clamp means for green, red and blue color signals respectively for clamping the waveform portions of said three color signals corresponding to the blanking period, the clamp levels thereof being capable of being clamped by a signal applied from an external source;

means for detecting the voltage of the waveform portion of said red color signal passed through said second clamp means and corresponding to the portion thereof optically masked by said optical black mask, comparing said voltage with a reference voltage thereby to generate a signal corresponding to the difference therebetween, and applying said difference signal to said second clamp means, thereby controlling the clamp level of said red color signal;

three blanking means for fixing the waveform portions of said color signals passed through said clamp means respectively and corresponding to the blanking period, to a predetermined voltage;

means for producing a red color difference (R−Y) signal and a blue color difference (B−Y) signal from the color signals subjected to the blanking process;

means for detecting the level of the waveform of said red color difference (R−Y) signal corresponding to the portion thereof optically masked by said optical black mask and the level of the waveform portion thereof subjected to the blanking process, generating a signal corresponding to the difference between said levels, and applying said difference signal to said first clamp means for clamping the green color signal, thereby controlling the clamp level of the green color signal; and means for detecting the level of the waveform of said blue color difference (B−Y) signal corresponding to the portion thereof optically masked by said optical black mask and the level of the waveform portion thereof subjected to the blanking process, generating a signal corresponding to the difference between said levels, and applying said difference signal to said third clamp means for clamping the blue color signal, thereby controlling the clamp level of said blue color signal.

6. A signal processing circuit according to claim 5, wherein said means for controlling the clamp level of said first and third clamp means includes first sample-and-hold circuits turned on by a gate pulse generated at a timing of production by said image pick-up device of a signal corresponding to the portion of the light-receiving surface optically masked by said optical black mask, said first sample-and-hold circuits being supplied with a color difference signal at the input thereof, second sample-and-hold circuits turned on by a gate pulse generated during the blanking period and supplied with the same color difference signal at the input thereof, and comparison amplifiers supplied with the outputs of said first and second sample-and-hold circuits at the two inputs thereof respectively.

7. A signal processing circuit for automatically adjusting the black balance of an output video signal for a color video camera including an image pick-up device for producing the three primary color signals of green, red and blue, comprising:

an optical black mask for optically masking a predetermined part of the light-receiving surface of the image pick-up device;

first, second and third clamp means for the green, red and blue color signals respectively for clamping the waveform portions of said three color signals corresponding to the blanking period, the clamp level thereof being capable of being controlled by a signal applied from an external source;

means for detecting the voltage of the waveform of the blue color signal passed through said third clamp means and corresponding to the portion thereof optically masked by said optical black mask, comparing said voltage with a reference signal thereby to produce a difference signal therebetween, and applying said difference voltage to said third clamp means, thereby controlling the clamp level of said blue color signal;

three blanking processing means for fixing the waveform portions of said color signals passed through said clamp means and corresponding to the blanking period, to a predetermined voltage;

means for producing a red color difference (R−Y) signal and a blue color difference (B−Y) signal from said color signals subjected to the blanking process;

means for detecting the level of the waveform portion of said blue color difference (B−Y) signal optically masked by said optical black mask and the level of the waveform portion thereof subjected to the blanking process, generating a signal corresponding to the difference between the two levels, and applying said signal to said first clamp means for clamping the green color signal, thereby controlling the clamp level of said green color signal; and means for detecting the level of the waveform portion of said red color difference (R−Y) signal optically masked by said optical black mask and the level of the waveform portion thereof subjected to the blanking process, generating a signal corresponding to the difference between the levels, and applying said signal to said second clamp means for clamping the red color signal, thereby controlling the clamp level of the red color signal.

8. A signal processing circuit according to claim 7, wherein said means for controlling the clamp levels of said first and second clamp means include first sample-and-hold circuits turned on by a gate pulse generated at a timing of production by said image pick-up device of a signal corresponding to the portion of the light-receiving surface optically masked by said optical black mask, said first sample-and-hold circuit being supplied with a color difference signal at the input thereof, second sample-and-hold circuits turned on by a gate pulse generated during the blanking period and supplied with the same color difference signal at the input thereof, and comparison amplifiers supplied with the outputs of said first and second sample-and-hold circuits at the two inputs thereof respectively.

9. A signal processing circuit for automatically adjusting the black balance of an output video signal for a color video camera including an image pick-up device for producing a luminance signal and two of the three primary color signals separately, comprising:

an optical black mask for optically masking a predetermined part of the light-receiving surface of said image pick-up device;

first, second and third clamp means for clamping the waveforms of said luminance signal and said two color signals corresponding to the blanking period respectively, the clamp levels thereof being capable of being controlled by a signal applied from an external source;

means for detecting the voltage of the waveform portion of the luminance signal passed through said first clamp means optically masked by said optical black mask, comparing said voltage with a reference voltage and applying a signal corresponding to the difference therebetween to said first clamp means, thereby controlling the clamp level of said luminance signal;

three blanking processing means for fixing the waveform portions of said luminance signal and said two color signals corresponding to the blanking period respectively, to a predetermined voltage;

means for producing two color difference signals from said luminance signal and said two color signals subjected to the blanking process; and means for detecting the level of the waveform portions of said two color difference signals optically masked by said optical black mask and the level of the waveform portions thereof subjected to the blanking process, generating signals corresponding to the differences between the levels respectively, and applying said difference signals to said second and said third clamp means for clamping said two color signals respectively, thereby controlling the clamp levels of said two color signals respectively.

10. A signal processing circuit according to claim 9, wherein said means for controlling the clamp levels of said second and third clamp means include first sample-and-hold circuits turned on by a gate pulse generated at a timing of production by said image pick-up device of a signal corresponding to the portion of the light-receiving surface optically masked by said optical black mask, said first sample-and-hold circuits being supplied with a color difference signal at the input thereof, second sample-and-hold circuits turned on by a gate pulse generated during the blanking period and supplied with the same color difference signal at the input thereof, and comparison amplifiers supplied with the outputs of said first and second sample-and-hold circuits respectively at the two inputs thereof.

* * * * *